US008516556B2

(12) United States Patent
MacNider et al.

(10) Patent No.: US 8,516,556 B2
(45) Date of Patent: Aug. 20, 2013

(54) METHODS FOR SERVER-DRIVEN PACKET CONGESTION CONTROL

(75) Inventors: James MacNider, Ottawa (CA); Avi Lior, Ottawa (CA); Li Zou, Nepean (CA)

(73) Assignee: Bridgewater Systems Corp., Ottawa (CA)

( * ) Notice: Subject to any disclaimer, the term of this patent is extended or adjusted under 35 U.S.C. 154(b) by 493 days.

(21) Appl. No.: 12/790,499

(22) Filed: May 28, 2010

(65) Prior Publication Data

US 2011/0296500 A1    Dec. 1, 2011

(51) Int. Cl.
*G06F 15/16*    (2006.01)
(52) U.S. Cl.
USPC ............... 726/4; 726/21; 709/224; 709/225
(58) Field of Classification Search
USPC .................. 726/1, 3–5, 13–15; 709/224
See application file for complete search history.

(56) References Cited

U.S. PATENT DOCUMENTS

| | | | |
|---|---|---|---|
| 7,062,568 B1* | 6/2006 | Senevirathne et al. | 709/234 |
| 7,269,727 B1* | 9/2007 | Mukherjee et al. | 713/160 |
| 7,389,354 B1* | 6/2008 | Sitaraman et al. | 709/229 |
| 7,509,394 B2* | 3/2009 | Kim | 709/217 |
| 8,015,414 B2* | 9/2011 | Mahone et al. | 713/189 |
| 8,266,327 B2* | 9/2012 | Kumar et al. | 709/229 |
| 8,356,171 B2* | 1/2013 | Shatzkamer et al. | 713/155 |
| 2009/0265542 A1* | 10/2009 | Khetawat et al. | 713/151 |
| 2011/0007705 A1* | 1/2011 | Buddhikot et al. | 370/331 |

OTHER PUBLICATIONS

Cisco Systems' Configuring Quality of Service, Chapter 30, May 4, 2009, pp. 30-1 to 30-57.*

* cited by examiner

*Primary Examiner* — Amare F Tabor
(74) *Attorney, Agent, or Firm* — Zilka-Kotab, PC

(57) ABSTRACT

Methods for congestion control by a AAA server are provided. In an embodiment of the invention a hint indicator is embedded in reply messages from a AAA server. In subsequent messages received by that AAA server, the AAA server determines when the hint indicator is present. Processing decisions for the subsequent message are based on the presence of the hint indicator. In another embodiment, a method for congestion control at the AAA server is provided. At the AAA server a message received from a network access server is stored and timestamped in an ingress message queue. A congestion state for the AAA server is determined based on an ingress queue state and a message age state. The message is processed based on the congestion state. In alternative embodiments, message processing is based on the congestion state, message type and number of round trip messages.

32 Claims, 8 Drawing Sheets

US 8,516,556 B2

METHODS FOR SERVER-DRIVEN PACKET CONGESTION CONTROL

BACKGROUND OF THE INVENTION

1. Field of the Invention

The present invention relates generally to data communications networks, and specifically to congestion control.

2. Background Art

In most networks, it is possible for a server to become subject to a level of load that is beyond its designed capacity for a period of time. For example, this could be due to an outage event such as a power failure, whose restoration causes all affected clients to attempt to reconnect at roughly the same time. When this situation arises, the server will have to drop many of the client requests because the server becomes overloaded.

In a simple case, where the interaction between the client and the server is a single request/response pair, existing algorithms for determining which messages to drop are usually sufficient. These are usually pseudo-random and based on dropping messages that arrive after a given message queue is full or that are of a certain age in the queue. The messages are typically dropped before they are added to a queue.

However, if the interaction between the client and the server requires multiple request/response pairs in order for the overall exchange to succeed, a message being dropped part way through the exchange by the server will most often force the client to restart the exchange from the beginning. This wastes the resources that both the client and the server have expended, increases the time for the client to finish the exchange and introduces additional messages into the network, which will further worsen the problem.

What is therefore needed is methods for congestion control at servers that recognize the unique characteristics associated with exchanges between a client and a server that require multiple request/response pairs for the overall exchange to succeed.

In an embodiment of the present invention, a method for congestion control by a AAA server is provided. The method includes receiving at the AAA server from a network access server (NAS) an initial message for a session that was initiated as a result of a network request from a client device or software object. A hint indicator is embedded within a response message to the received message. The hint indicator identifies a processing priority for subsequent messages received from the client device by the AAA server. A response message is transmitted having the embedded hint indicator to the network access server. A subsequent message is received from the network access server at the AAA server within the session. The AAA server determines whether the subsequent message contains the hint indicator. Finally, the AAA server determines how to process the message based on the hint indicator. In an alternative embodiment, the AAA server tracks the number of rounds of message exchange that have occurred within a session, and includes a priority indicator in response messages. Further processing by the AAA server factors in whether the hint indicator is presence and the priority level.

In an alternative embodiment, a method for congestion control at the AAA server is provided. At the AAA server a message is received from a network access server (NAS) for a session that was initiated as a result of a network request from a client device or software object. The message is stored and timestamped in an ingress message queue. A congestion state for the AAA server is determined, when the message is dequeued from the ingress message queue. The congestion state is based on an ingress queue state and a message age state. The ingress queue state is based on the amount of messages within the ingress queue. The message age state is based on the duration the message has been in the ingress queue. Finally, the message is processed based on at least the congestion state. In alternative embodiments, the processing of a message is based on the congestion state, the type of message and the number of round trip messages that have occurred within an authentication session.

Further embodiments, features, and advantages of the invention, as well as the structure and operation of the various embodiments of the invention are described in detail below with reference to accompanying drawings

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
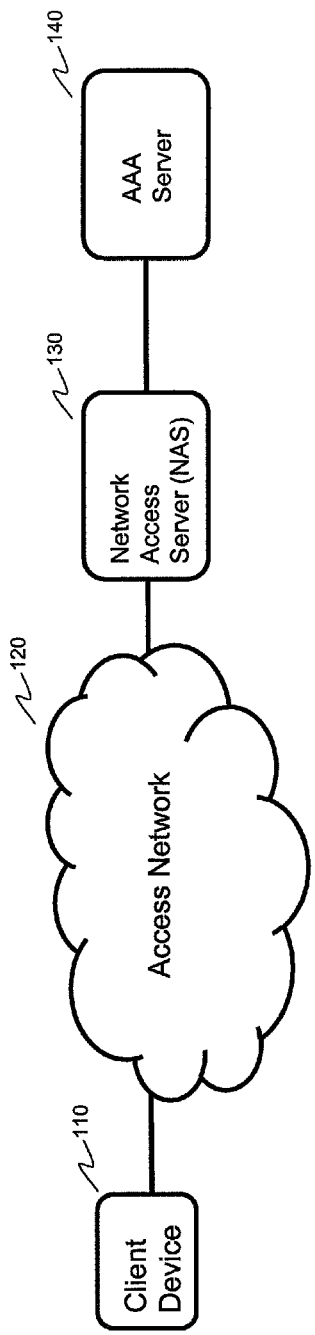
FIG. 1 is a schematic diagram of an architecture 100 of a communications network in which a client device accesses a AAA server thru a network access server.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

The invention will be better understood from the following descriptions of various "embodiments" of the invention. Specific "embodiments" are views of the invention, but each does not itself represent the whole invention. In many cases individual elements from one particular embodiment may be substituted for different elements in another embodiment carrying out a similar or corresponding function.

FIG. 1 is a schematic diagram of an architecture 100 of a communications network in which a client device accesses a AAA server through a network access server. Architecture 100 includes client device 110, access network 120, network access server (NAS) 130, and an authentication, authorization and accounting (AAA) server 140. Architecture 100 represents, in simplified form, a subscriber network to illustrate the concepts of the present invention. As will be known by individuals skilled in the relevant arts, the present invention can be used in any type of data communication network, including, but not limited to wireless and wireline networks. In an actual network implementation, NAS 130 and AAA server 140 support many client devices, such as client device 110.

Client device 110 is any device that provides a user access to one or more networks. Client device 110 can include, but is not limited to, a laptop computer, a cellular phone, a smart phone, a PDA, other wireless mobile devices, or wired network devices. Client device 110 can also include a software object transmitting messages. Access network 120 represents a network that may require a user of client device 110 to be authenticated or authorized before a user is granted access to network resources. Access network 120 can be a wireline or a wireless network. Network access server (NAS) 130 is the point of access for client device 110. AAA server 140 performs authentication, authorization and accounting functions. It should be noted that authentication, authorization and accounting functions can be split across two or more servers (e.g., authentication/authorization server and accounting server).

In some embodiments, the methods of the present invention are described in terms of a typical AAA transaction in the RADIUS and DIAMETER protocols. These descriptions are for exemplary purposes only and are not intended to be limiting.

Referring to FIG. 1, when client device 110 attaches to the access network 120, network access server 130 needs to authenticate with AAA server 140 before network access is granted. The subscriber provides credentials to network access server 130. Network access server 130 forwards the credentials to AAA server 140.

The credential validation may involve Extensible Authentication Protocol (EAP). EAP is an authentication framework frequently used in wireless networks and point-to-point communications. RFC 3748 defines the Extensible Authentication Protocol (EAP), as an authentication framework which supports multiple authentication methods. EAP typically runs directly over data link layers such as Point-to-Point Protocol (PPP) or IEEE 802, without requiring IP. EAP provides its own support for duplicate elimination and retransmission, but is reliant on lower layer ordering guarantees. RFC 3748 is incorporated herein by reference in its entirety.

The transport between network access server 130 and AAA server 140 is typically carried over AAA transactions using RADIUS or DIAMETER protocols. Remote Authentication Dial In User Service (RADIUS) is a networking protocol that provides centralized Authentication, Authorization, and Accounting management for computers to connect and use a network service. Authentication and authorization characteristics in RADIUS are described in RFC 2865, which is incorporated herein by reference in its entirety. DIAMETER is a computer networking protocol for authentication, authorization and accounting, and is a successor to RADIUS, which is defined in RFC 3588. RFC 3588 is incorporated herein by reference in its entirety.

An embodiment of the invention provides a method for a server to inject a 'hint' into its response messages that will be echoed back to it by the network access server in a subsequent message. This hint will mark the message as one that should be given higher priority or special processing because it is part of an existing exchange (not a new one) of messages within a session.

This hint is opaque to the network access server. The network access server does not need to interpret the hint or act on it in any way. The network access server's responsibility is to echo back the value that it was sent. At a time when the AAA server receives a higher volume of messages than it can manage, the AAA server will choose those messages that contain no hint as the first candidates to be discarded as an approach for managing the congestion.

This embodiment of the invention can be implemented in any number of existing client/server network protocols provided that they include a defined mechanism whereby an attribute value returned by the server must be echoed back by the network access server.

Figure 2:
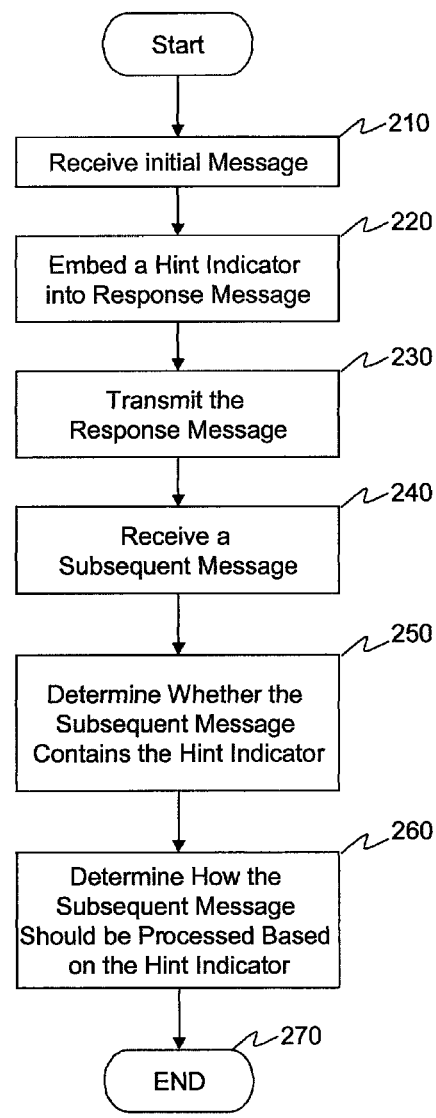
FIG. 2 is a flowchart of a method for congestion control by a AAA server, according to an embodiment of the invention.

FIG. 2 is a flowchart of a method 200 for congestion control by a AAA server, according to an embodiment of the invention. Method 200 begins in step 210. In step 210, a AAA server, such as AAA server 140 receives an initial message from a network access server, such as network access server 130 associated with a messaging session. In embodiments, AAA server 210 can operate using either the RADIUS or DIAMETER protocol.

Figure 3:
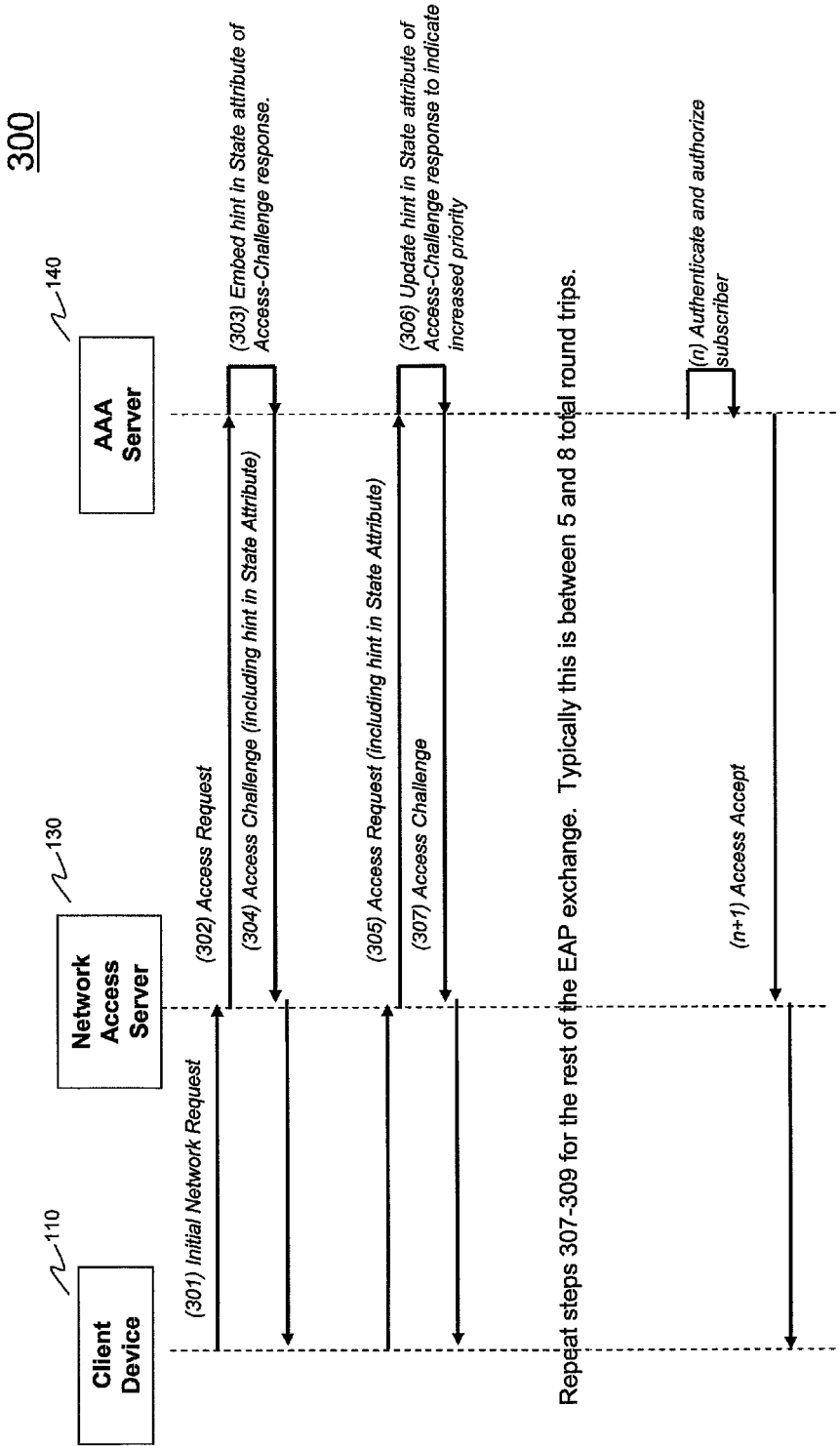
FIG. 3 is a timeline illustrating an exemplary message exchange, according to an embodiment of the invention.

In step 220, AAA server 140 embeds a hint indicator within a response message to the client device to a received message at an AAA server. The hint indicator identifies a processing priority for subsequent messages received from the client device by the AAA server. In an embodiment, the hint indicator is embodied within a state attribute of the response messages. FIG. 3 provides an example of embedding a hint indicator in a response message. Retelling to FIG. 3, in step 301, client device sends an initial network request message. In step 302, NAS 130 transmits an access request message to AAA server 140. In step 303, AAA server 140 embeds a hint in a State Attribute of an Access Challenge response message.

In an embodiment, AAA server 140 uses the same hint indicator for all messages regardless of the client device associated with the message. This removes complexity in that the AAA server does not need to include logic for creating and associating different hint indicators for each client device or each messaging session. Although, in embodiments, AAA server 140 can maintain different hint indicators based on client device, messaging sessions, types of service or other factors. When AAA server 140 uses the same hint indicator for all messages, AAA server 140 may periodically change the hint indicator to enhance security.

In embodiments, AAA server 140 may enable or disable the embedding of hint indicators into messages based on preset congestion level thresholds. For example, when AAA server 140 is in an uncongested state, the server can disable the use of hint indicators. Conversely, once AAA server 140 recognizes that it was in a congested state, AAA server 140 enables the hint indicator feature to ensure prioritization of processing of higher priority messages.

In additional embodiments, AAA server 140 may include a priority level within the hint indicator. The priority level serves to guide the processing of the message. For example, a high priority message may be sent when removed from an ingress message queue. Whereas a low priority message would be discarded when removed from the ingress message queue for processing.

In an embodiment, the messages being received may be contained within a multi-round EAP authentication sessions. Multi-leg protocols such as EAP are becoming increasingly common place, especially in WiFi, WiMAX and LTE networks, where it is a fundamental part of the security infrastructure. The present embodiment enables a server to cope with an overload of requests in a graceful manner, allowing the maximum number of clients to connect in the shortest possible period of time.

The priority level may be set based on the round trip that the message belongs to. For example, a priority of "1" might be given to a message within a first round trip of messages, while a priority of "2" would be given to a message within a second round trip of messages. When congestion occurs, those messages that are part of an exchange in which multiple rounds have occurred would be given priority. In this way, the management of congestion is more efficient because fewer messages will need to be retransmitted.

In step 230, AAA server 140 transmits the response message having the embedded hint indicator to NAS 130. Referring again to FIG. 3, in step 304 an Access Challenge response message is transmitted that includes the hint indicator.

In step 240, AAA server 140 receives a subsequent message within the session from NAS 130. Referring to FIG. 3, in step 305, NAS 130 transmits the Access Request message that includes the hint indicator, which is received by AAA server 140.

In step 250, AAA server 140 determines whether the subsequent message contains the hint indicator. The AAA server determines whether the subsequent message contains the hint indicator by scanning the subsequent message a sequence of bytes matching the hint indicator. In an embodiment, determining whether the subsequent message contains the hint indicator occurs prior to processing any other data contained within the subsequent message. Referring to FIG. 3, AAA server 140 determines that the subsequent message includes the hint indicator in step 306. Also, in step 306 in an embodiment, AAA server 140 may update the priority indicator to reflect that an additional round of messages has occurred. As illustrated in FIG. 3 there may be multiple rounds of message exchanges. Typically, in an EAP authentication session there can be five to eight total rounds.

In step 260, AAA server 140 determines how the subsequent message should be processed based in part on the presence or lack of a hint indicator.

For example, upon receipt of the subsequent message, if the message did not have a hint indicator the message would be dropped. While on the other hand, if the message did have a hint indicator it would be processed normally and the session not interrupted. As mentioned above, in some instances a priority level may be associated with the hint indicator. In this scenario, different processing schemes are employed to process a message based on its priority level. For example, subsequent messages with a low priority might be dropped upon receipt. Messages within a mid-range priority might be added to the ingress message queue. Upon being removed from the ingress message queue for subsequent processing, AAA server 140 may again review the priority level to determine how to process the message. For example, messages with a high priority would be processed normally. While a low priority message would be dropped.

While this embodiment addresses general network overload and congestion scenarios, it can also be extended to provide a preferred level of service to specific clients based on provisioning on the server. That is, hint indicators could be inserted into selected messages associated with preferred customers, preferred services and the like. These messages would then be given higher priority in the event of congestion.

Figure 4:
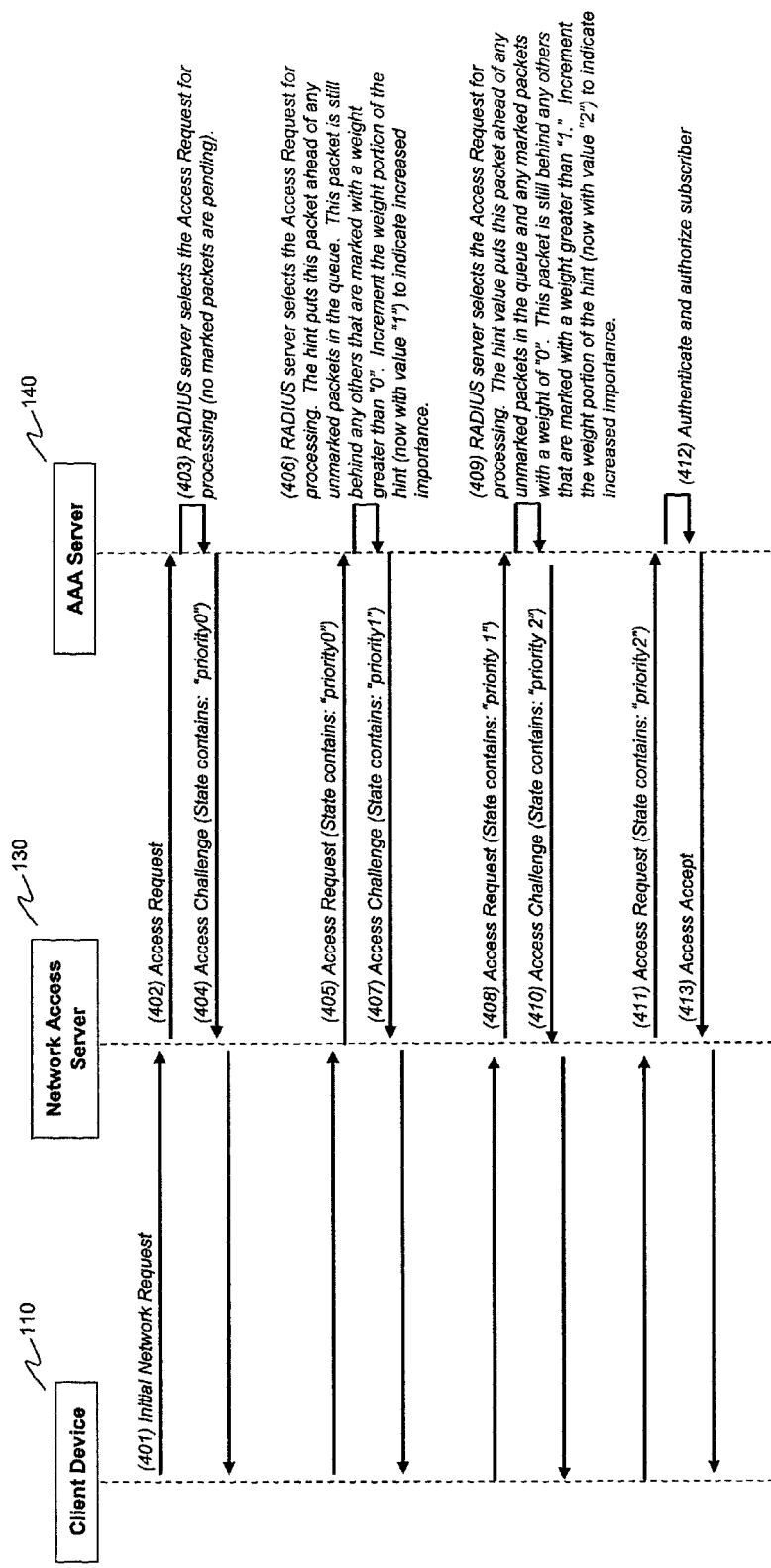
FIG. 4 is a timeline illustrating an exemplary message exchange, according to an embodiment of the invention.
Figure 5:
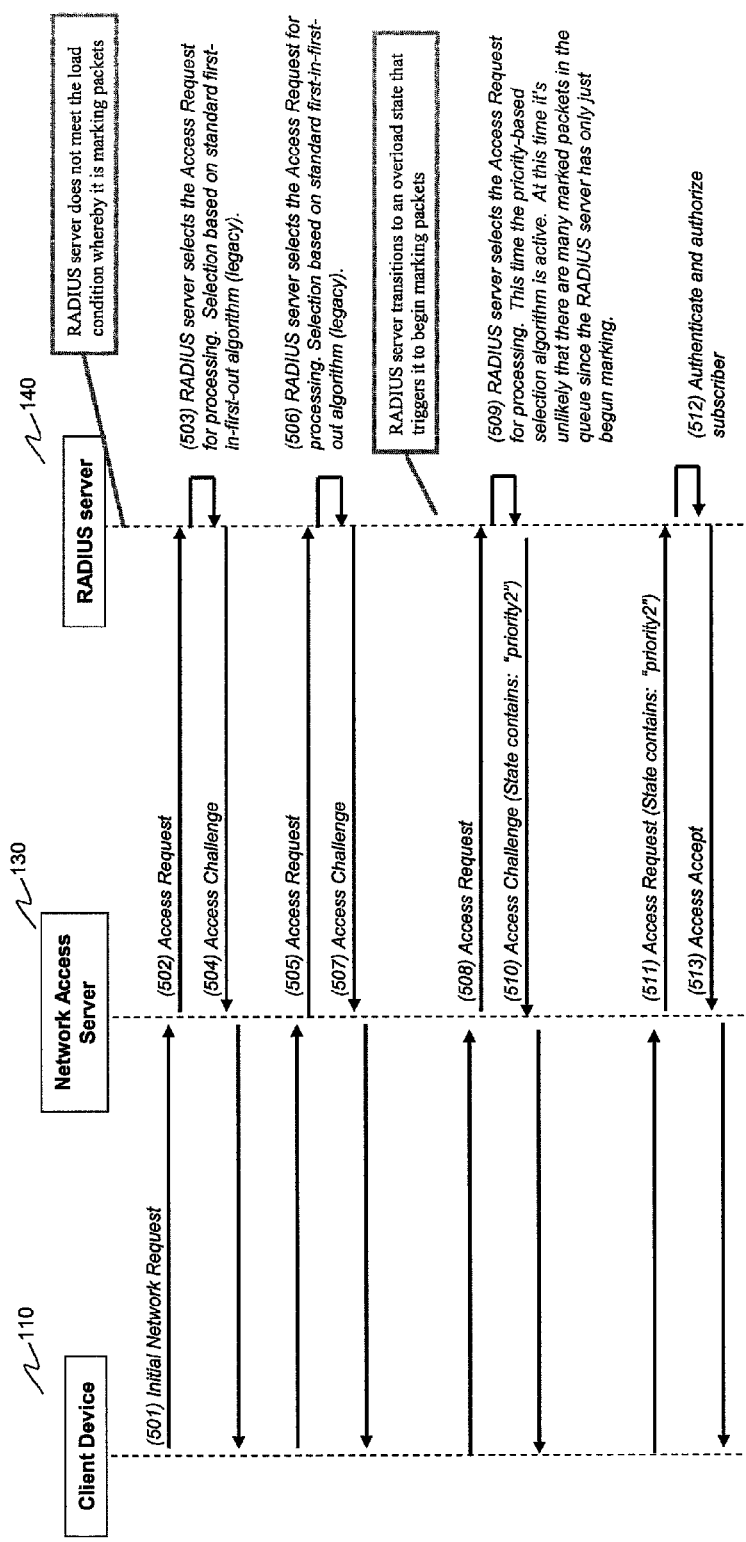
FIG. 5 is a timeline illustrating an exemplary message exchange, according to an embodiment of the invention.

FIGS. 4 and 5 provide additional message exchanges highlighting various embodiments of the invention. Specifically, FIG. 4 illustrates the incrementing of a priority indicator for each message round. Notably in Step 403, AAA server 140 embeds a priority "0," representative of the fact that the message received is the initial message in an exchange. In Step 406, AAA server 140 embeds a priority "1," representative of the fact that the message received is part of a session in which one round trip exchange has been completed. In Step 409, AAA Server 140 embeds a priority "2," representative of the fact that the message received is part of a session in which two round trip exchanges have been completed. By incrementing the priority indicator, messages with higher priority levels will be given preferential routing treating in the event of network congestion. That is, a message with a higher priority will receive prioritization in terms of routing and will be less likely to be discarded than a message with a lower priority.

FIG. 5 illustrates the enabling and disabling of embedding hint indicators into messages. Initially, the AAA server is not congested and the hint indicator mechanism is disabled. Following steps 501-507, AAA server 140 recognizes that a congestion state exists and begins marking packets by embedding hint indicators in subsequent messages and giving priority processing to messages that include the hint indicator and optionally priority indicators.

Figure 6:
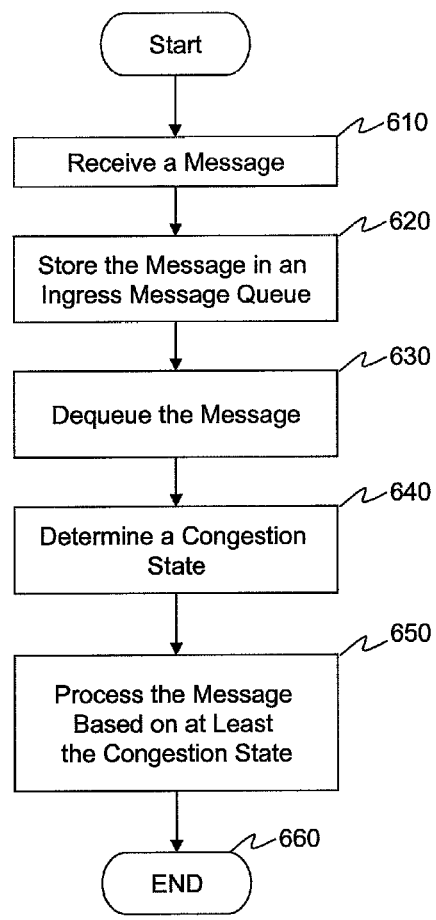
FIG. 6 is a flowchart of a method for congestion control by a AAA server, according to an embodiment of the invention.

FIG. 6 is a flowchart of a method 600 for congestion control by a AAA server, according to an embodiment of the invention. Method 600 begins in step 610. In step 610, client device 110 sends an initial network request message and as a result a message from a network access server, such as, for example, network access server 130, is received by an AAA server, such as, for example, AAA Server 140. AAA Server 140 uses either a RADIUS or DIAMETER protocol.

In step 620, the message is stored in an ingress message queue and the time when the message arrives is time stamped and stored. In an embodiment, the timestamp is stored within the ingress message queue.

In step 630, the message is removed, or dequeued, from the ingress message queue for processing. In step 640, a congestion state is determined when the message is dequeued. In an embodiment, the congestion state is based on both an ingress queue state and a message age state. In other embodiments, the congestion state may simply be determined based on the ingress queue state, the message age state or another indicator of congestion within the AAA server.

The ingress queue state is based on the number of messages within the ingress queue. In an embodiment, the ingress message queue state is based on the number of messages within the ingress message queue relative to a peak message capacity for the ingress message queue. In an embodiment, the ingress message queue is a first in, first out (FIFO) message queue. The size of the queue is set to be at least two seconds times the configured expected peak rate of message transactions.

In an embodiment, the ingress queue state is determined to be a first state (Green), a second state (Orange) or a third state (Red). These states correspond to the remaining capacity of the queue to hold incoming messages before overflowing. In an embodiment, the Green state (non-congested) is assigned when the queue is filled to a level in which the queue can hold more than one second of messages at the expected peak rate of transactions. The Orange state (congested) is assigned when the queue is filled to a level in which the queue can hold between one second and one half second of messages at the expected peak rate of transactions. The Red state (severely congested) is assigned when the queue is filled to a level in which the queue can hold less than one half second of messages at the expected peak rate of transactions.

The message age state is based on the duration that a message has been in the ingress queue. In an embodiment, the message age state is based on a message age relative to a request timeout parameter, for example, RRTO (request retransmit timeout). The message age is the time from the message timestamp to the time when the message is dequeued. The request timeout parameter is an amount of time in which a session will timeout if a return message has not been sent to respond to an incoming message.

A message age state is determined to be a first state (Green), a second state (Orange) and a third state (Red). In an embodiment, these states are based on the message age relative to a request timeout parameter. The message age state is set to Green (not congested) if the message age is less than or equal to ⅗ of the request timeout parameter, is set to Orange (congested) if the message age is greater than ⅗ and less than or equal to ⅘ of the request timeout parameter, and is set to Red (severely congested) if the message age is greater than ⅘ of the request timeout parameter.

In an embodiment, the congestion state is set to the congestion state of the message age state or the ingress queue state based on which of the message age state or ingress queue state is most indicative of a higher level of congestion at the AAA server.

In an alternative embodiment, the AAA server congestion state is determined by assigning the first state, the second state or the third state to the congestion state. In one approach, the third state is set as the congestion state when either the message age state or the ingress queue state has been assigned the third state (severely congested). The second state (congested) is assigned to the congestion state when neither the message age state nor the ingress queue state has been assigned the third state and either the message age state or the ingress queue state has been assigned the second state. Finally, the first state (not congested) is assigned to the congestion state when both the message age state and the ingress queue state have been assigned the first state. The following table provides an example demonstrating how the congestion state is determined for the AAA server based on the ingress message queue state and message age state. In this case, the first state is Green (not congested), the second state is Orange (congested) and the third state is Red (severely congested).

| Ingress Queue State | Message Age State | AAA Server Congestion State |
| --- | --- | --- |
| Green | Green | Green |
| Green | Orange | Orange |
| Green | Red | Red |
| Orange | Green | Orange |
| Orange | Orange | Orange |
| Orange | Red | Red |
| Red | Whatever state | Red |

In step 650, the message is processed based on at least the congestion state. For example, in an embodiment a message is processed normally when the congestion state is Green, is dropped with a first probability when the congestion state is Orange and is dropped with a second probability when the congestion state was Red. The first probability would typically be less than the second probability. For example, in an embodiment the first probability would be 50% and the second probability would be 75%.

In step 660, Method 600 ends. In an alternative embodiment, when a response message is returned in response to the received message, the AAA server injects the Accounting-Realtime-Required AVP into the response message to an accounting start message received from the network access server. The value of the Accounting-Realtime-Required AVP is set to GRANT_AND_LOSE (3). The Accounting-Realtime-Required AVP indicates to the network access server that service should be granted even if accounting records cannot be delivered or stored. In this embodiment, NAS 130 supports the State AVP, which is used to track the multi-round legs for each EAP authentication session, and supports the Accounting-Realtime-Required AVP.

Figure 7:
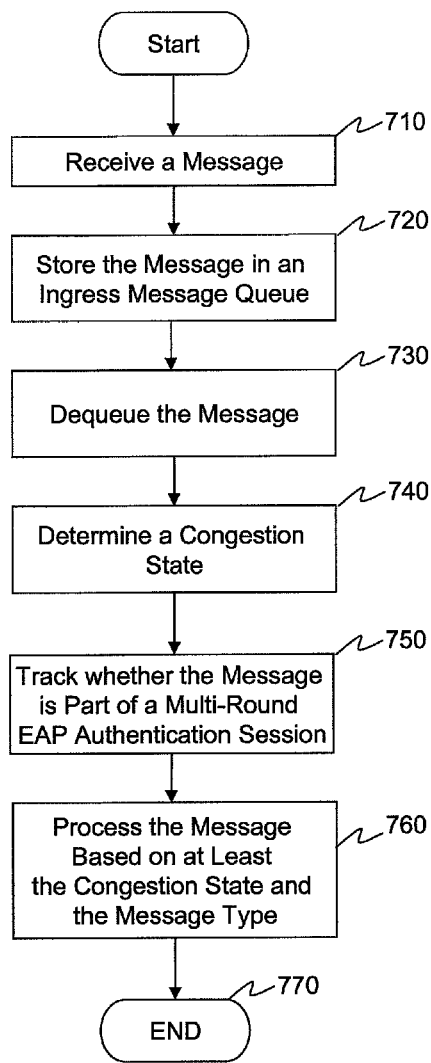
FIG. 7 is a flowchart of a method for congestion control by a AAA server, according to an embodiment of the invention.

FIG. 7 is a flowchart illustrating a method 700 for congestion control by a AAA server, according to an embodiment of the invention. Method 700 extends the capabilities of Method 600 by additionally tracking whether a message is part of a multi-round EAP authentication session and by considering the message type. In doing so, congestion controls can be implemented that further ensure that high priority messages are processed and that messages are dropped in a manner that does not exacerbate a congestion event.

Method 700 begins in step 710. In step 710, client device 110 sends an initial network request message and as a result a message from a network access server, such as, for example, network access server 130, is received by an AAA server, such as, for example, AAA Server 140. AAA Server 140 uses either a RADIUS or DIAMETER protocol.

In step 720, the message is stored in an ingress message queue and the time when the message arrives is time stamped and stored. In an embodiment, the timestamp is stored within the ingress message queue.

In step 730, the message is the removed, or dequeued, from the ingress message queue for processing. In step 740 a congestion state is determined when the message is dequeued. In an embodiment, the congestion state is based on both an ingress queue state and a message age state. In other embodiments, the congestion state may simply be determined based on the ingress queue state, the message age state or another indicator of congestion within the AAA server.

The ingress queue state is based on the number of messages within the ingress queue. In an embodiment, the ingress message queue state is based on the number of messages within the ingress message queue relative to a peak message capacity for the ingress message queue. In an embodiment, the ingress message queue is a first in, first out (FIFO) message queue. The size of the queue is set to be at least two seconds times the configured expected peak rate of message transactions.

In an embodiment, the ingress queue state is determined to be a first state (Green), a second state (Orange) or a third state (Red). These states correspond to the remaining capacity of the queue to hold incoming messages before overflowing. In an embodiment, the Green state (non-congested) is assigned when the queue is filled to a level in which the queue can hold more than one second of messages at the expected peak rate of transactions. The Orange state (congested) is assigned when the queue is filled to a level in which the queue can hold between one second and one half second of messages at the expected peak rate of transactions. The Red state (severely congested) is assigned when the queue is filled to a level in which the queue can hold less than one half second of messages at the expected peak rate of transactions.

The message age state is based on the duration that a message has been in the ingress queue. In an embodiment, the message age state is based on a message age relative to a request timeout parameter, for example, RRTO (request retransmit timeout). The message age is the time from the message timestamp to the time when the message is dequeued. The request timeout parameter is an amount of time in which a session will timeout if a return message has not been sent to respond to an incoming message.

A message age state is determined to be a first state (Green), a second state (Orange) and a third state (Red). In an embodiment, these states are based on the message age relative to a request timeout parameter. The message age state is set to Green (not congested) if the message age is less than or equal to ⅗ of the request timeout parameter, is set to Orange (congested) if the message age is greater than ⅗ and less than or equal to ⅘ of the request timeout parameter and is set to Red (severely congested) if the message age is greater than ⅘ of the request timeout parameter.

In an embodiment, the congestion state is set to the congestion state of the message age state or the ingress queue state based on which of the message age state or ingress queue state is most indicative of a higher level of congestion at the AAA server.

In an alternative embodiment, the AAA server congestion state is determined by assigning the first state, the second state or the third state to the congestion state. In one approach, the third state is set as the congestion state when either the message age state or the ingress queue state has been assigned the third state (severely congested). The second state (congested) is assigned to the congestion state when neither the message age state nor the ingress queue state has been assigned the third state and either the message age state or the ingress queue state has been assigned the second state. Finally, the first state (not congested) is assigned to the congestion state when both the message age state and the ingress queue state have been assigned the first state. The following table provides an example demonstrating how the congestion state is determined for the AAA server based on the ingress message queue state and message age state. In this case, the first state is Green (not congested), the second state is Orange (congested) and the third state is Red (severely congested).

| Ingress Queue State | Message Age State | AAA Server Congestion State |
|---|---|---|
| Green | Green | Green |
| Green | Orange | Orange |
| Green | Red | Red |
| Orange | Green | Orange |
| Orange | Orange | Orange |
| Orange | Red | Red |
| Red | Whatever state | Red |

In step 750 the message is tracked to identify whether the message is part of a multi-round EAP authentication session, and to identify the number of round trips that have occurred within the EAP authentication session. In an embodiment, tracking is handled using the methods described with respect to FIG. 2 above, in which a hint indicator is embedded into response messages with a priority indicator that is incremented upon each round trip of messages within a session.

In step 760 the message is processed based on at least the congestion state and the message type. For example, in an embodiment a message would be processed as indicated in the following table based on the congestion state, the type of message and the number of rounds within an authentication session.

In step 760 Method 700 ends. In an alternative embodiment, when a response message is returned in response to the received message, the AAA server injects the Accounting-Realtime-Required AVP into the response message to an accounting start message received from the network access server. The value of the Accounting-Realtime-Required AVP is set to GRANT_AND_LOSE (3). The Accounting-Realtime-Required AVP indicates to the network access server that service should be granted even if accounting records cannot be delivered or stored. In this embodiment, NAS 130 supports the State AVP, which is used to track the multi-round legs for each EAP authentication session, and supports the Accounting-Realtime-Required AVP.

Computer System Implementation

Figure 8:
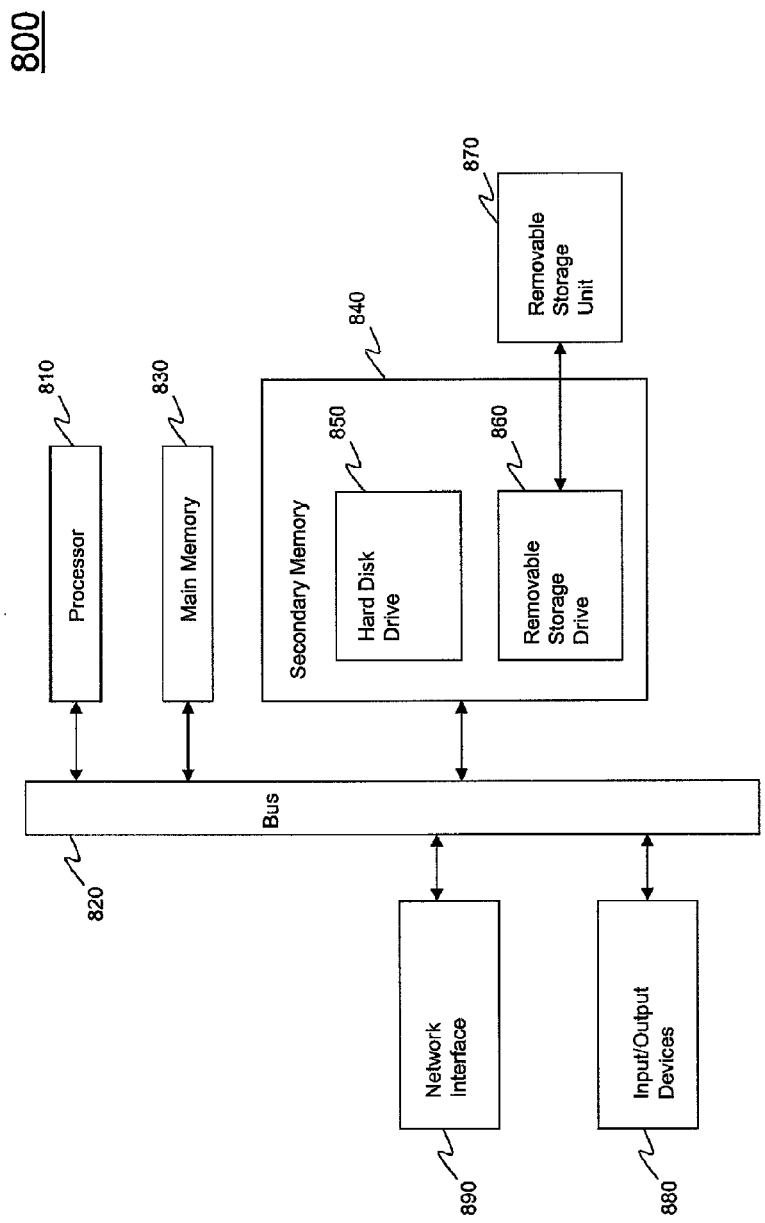
FIG. 8 is a schematic diagram of an exemplary computer system implantation, according to an embodiment of the invention.

FIG. 8 is a schematic diagram of an exemplary computer system implantation, according to an embodiment of the invention. Computer 800 includes one or more processors (also called central processing units, or CPUs), such as processor 810. Processor 810 is connected to communication bus 820. Computer 800 also includes a main or primary memory 830, preferably random access memory (RAM). Primary memory 830 has stored therein control logic (computer software), and data.

Computer 800 may also include one or more secondary storage devices 840. Secondary storage devices 840 include, for example, hard disk drive 850 and/or removable storage device or drive 860. Removable storage drive 860 represents a floppy disk drive, a magnetic tape drive, a compact disk drive, an optical storage device, tape backup, etc.

Removable storage drive 860 interacts with removable storage unit 870. As will be appreciated, removable storage unit 860 includes a computer usable or readable storage medium having stored therein computer software (control logic) and/or data. Removable storage drive 860 reads from and/or writes to the removable storage unit 870 in a well known manner.

Removable storage unit 870, also called a program storage device or a computer program product, represents a floppy disk, magnetic tape, compact disk, optical storage disk, or any other computer data storage device. Program storage devices or computer program products also include any device in which computer programs can be stored, such as hard drives, ROM or memory cards, etc.

In an embodiment, the present invention is directed to computer program products or program storage devices hav-

|  | Congestion State Green (not congested) | Congestion State Orange (congested) | Congestion State Red (severely congested) |
|---|---|---|---|
| New EAP Auth Session | No action | Drop with 50% chance probabilistically. | Drop the EAP request message. |
| In-Progress EAP Auth Session | No action | No action | Drop with P = (100% − multi-rounds * 45%) probabilistically. If P is zero or negative, no action. |
| Accounting Start/Event | No action | No action | No action |
| Accounting Interim | No action | Drop with 50% chance probabilistically. | Drop with 60% chance probabilistically. |
| Accounting Stop | No action | No action | Drop with 60% chance probabilistically. | ing software that enables computer 800, or multiple computer 800s to perform any combination of the functions described herein.

Computer programs (also called computer control logic) are stored in main memory 830 and/or the secondary storage devices 840. Such computer programs, when executed, direct computer 800 to perform the functions of the present invention as discussed herein. In particular, the computer programs, when executed, enable processor 810 to perform the functions of the present invention. Accordingly, such computer programs represent controllers of the computer 800.

Computer 800 also includes input/output/display devices 880, such as monitors, keyboards, pointing devices, etc.

Computer 800 further includes a communication or network interface 890. Network interface 890 enables computer 800 to communicate with remote devices. For example, network interface 890 allows computer 800 to communicate over communication networks, such as LANs, WANs, the Internet, etc. Network interface 890 may interface with remote sites or networks via wired or wireless connections. Computer 800 receives data and/or computer programs via network interface 890.

The invention can be implemented in various ways and manners including software, hardware, firmware and operating system implementations other than those described herein. Any software, hardware, firmware and operating system implementations suitable for performing the functions described herein can be used.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Conclusion

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A method for congestion control by a AAA server, comprising:

receiving at the AAA server an initial message from a network access server for a session;

embedding a hint indicator within a response message to the network access server in response to the received message at the AAA server, wherein the hint indicator identifies a processing priority for subsequent messages received from the client device by the AAA server, and wherein the embedding of hint indicators into messages is enabled at the AAA server based on a congestion level threshold;

transmitting the response message having the embedded hint indicator to the network access server;

receiving a subsequent message from the network access server at the AAA server within the session;

determining whether the subsequent message contains the hint indicator;

tracking the subsequent message to identify whether the message is part of a multi-round EAP (Extensible Authentication Protocol) authentication session, and to identify the number of round trips that have occurred within the EAP authentication session; and determining how the subsequent message should be processed based on the hint indicator.

2. The method of claim 1, wherein determining whether the subsequent message contains the hint indicator includes scanning the subsequent message for a sequence of bytes matching the hint indicator.

3. The method of claim 1, wherein determining whether the subsequent message contains the hint indicator occurs prior to processing any other data contained within the subsequent message.

4. The method of claim 1, further comprising changing periodically the hint indicator by the AAA server.

5. The method of claim 1, wherein the AAA server uses a RADIUS or DIAMETER protocol.

6. The method of claim 1, further comprising disabling, at the AAA server, the embedding of hint indicators into messages based on the congestion level threshold.

7. The method of claim 6, wherein the hint indicator includes a priority level.

8. The method of claim 7, further comprising discarding messages having a priority level less than a preset priority threshold upon a congestion level of the AAA server exceeding a preset congestion threshold.

9. The method of claim 1, wherein the messages exchanged by the AAA server are contained within a multi-round EAP authentication.

10. The method of claim 9, wherein embedding a hint indicator within a response message comprises embedding the hint indicator in a State Attribute.

11. The method of claim 9, wherein the hint indicator includes a priority level.

12. The method of claim 11, further comprising incrementing the priority level based on a stage of EAP authentication.

13. A method for congestion control by a AAA server, comprising:

receiving at the AAA server a message from a network access server;

storing the message in an ingress message queue, wherein the ingress message queue state is based on the number of messages within the ingress message queue relative to a peak message capacity for the ingress message queue;

timestamping a time when the message is stored in the ingress message queue;

determining a congestion state when the message is dequeued from the ingress message queue, wherein the congestion state is based on the ingress message queue state and a message age state, wherein the ingress message queue state is based on the amount of messages within the ingress message queue, wherein the message age state is based on the duration the message has been in the ingress queue;

tracking the message to identify whether the message is part of a multi-round EAP authentication session, and to identify the number of round trips that have occurred within the EAP authentication session; and processing the message based on at least the congestion state.

14. The method of claim 13, wherein the message age state is based on a message age relative to a request timeout parameter, wherein the message age is the time from the message timestamp to the time when the message is dequeued, wherein the request timeout parameter is an amount of time in which a session will timeout if a return message has not been sent to the message.

15. The method of claim 13, wherein determining a congestion state includes setting the congestion state to the message age state or the ingress queue state based on which of the message age state or ingress queue state is most indicative of congestion at the AAA server.

16. The method of claim 13, further comprising:

determining a message age state that is a first state, a second state or a third state, and determining an ingress queue state that is a first state, a second state or a third state, wherein the first state indicates that the AAA server is not congested, the second state indicates that the AAA server is congested and the third state indicates that the AAA server is severely congested.

17. The method of claim 16, wherein determining a congestion state includes assigning the first state, the second state or the third state to the congestion state.

18. The method of claim 17, further comprising:

assigning the third state to the congestion state when either the message age state or the ingress queue state has been assigned the third state, or assigning the second state to the congestion state when neither the message age state nor the ingress queue state has been assigned the third state and either the message age state or the ingress queue state has been assigned the second state, or assigning the first state to the congestion state when both the message age state and the ingress queue state have been assigned the first state.

19. The method of claim 18, further comprising tracking whether the message is associated with a multi-round EAP session.

20. The method of claim 19, wherein the message has a message type of a new EAP authentication session, an in-progress EAP authentication, an accounting start, an accounting interim, or an accounting stop.

21. The method of claim 20, further comprising processing the message based on whether the message has a message type of EAP authentication session or accounting.

22. The method of claim 20, wherein processing the message based on at least the congestion state and message type when the congestion state is the first state includes processing the message normally for all message types.

23. The method of claim 22, wherein processing the message based on at least the congestion state and message type when the congestion state is the second state includes: dropping the message with a first probability when the message has a message type of new EAP authentication session or accounting interim, or processing the message with normal processing when the message has any other message type.

24. The method of claim 23, wherein processing the message based on at least the congestion state and message type includes when the congestion state is the third state: dropping the message when the message has a message type of new EAP authentication session, or dropping the message when the message has a message type of in-progress authentication session with a probability based on the rounds that have occurred within the EAP authentication session, wherein the message is not dropped when rounds has reached a threshold, or dropping the message when the message has a message type of accounting interim with a second probability that is greater than the first probability, or dropping the message when the message has a message type of accounting stop with a third probability, or processing the message with normal processing when the message has a message type of accounting start.

25. The method of claim 13, further comprising tracking whether the message is associated with a multi-round EAP session.

26. The method of claim 25, further comprising tracking the round of the multi-round EAP session.

27. The method of claim 26, further comprising processing the message based on the round of the multi-round EAP session.

28. The method of claim 13, wherein the AAA server uses a RADIUS OR DIAMETER protocol.

29. The method of claim 13, further comprising injecting the Accounting-Realtime-Required AVP into the response message to an accounting start message received from the network access server by the AAA server.

30. The method of claim 29, wherein the value of the Accounting-Realtime-Required AVP is set to GRANT_AND_LOSE (3), wherein the Accounting-Realtime-Required AVP indicates to the network access server that service should be granted even if accounting records cannot be delivered or stored.

31. A computer program product comprising a non-transitory computer useable medium including control logic stored therein, which upon execution by a processor would cause the processor to carry out a method comprising:

receiving at the AAA server a message from a network access server;

storing the message in an ingress message queue, wherein the ingress message queue state is based on the number of messages within the ingress message queue;

timestamping a time when the message is stored in the ingress message queue;

determining a congestion state when the message is dequeued from the ingress message queue, wherein the congestion state is based on the ingress message queue state and a message age state, wherein the ingress message queue state is based on the amount of messages within the ingress message queue, wherein the message age state is based on the duration the message has been in the ingress message queue;

tracking the message to identify whether the message is part of a multi-round EAP authentication session, and to identify the number of round trips that have occurred within the EAP authentication session; and processing the message based on at least the congestion state.

32. The computer program product of claim 31, including control logic stored therein, which upon execution by a processor would cause the processor to carry out a method further comprising:

determining a message age state that is a first state, a second state or a third state, and determining an ingress queue state that is a first state, a second state or a third state, wherein the first state indicates that the AAA server is not congested, the second state indicates that the AAA server is congested and the third state indicates that the AAA server is severely congested.

* * * * *